(12) United States Patent
Sullivan et al.

(10) Patent No.: US 7,748,452 B2
(45) Date of Patent: *Jul. 6, 2010

(54) POLYMERIC MICROSPHERES AS DEGRADABLE FLUID LOSS ADDITIVES IN OILFIELD APPLICATIONS

(75) Inventors: Philip F Sullivan, Bellaire, TX (US); Gary John Tustin, Cambridge (GB); Bruno Drochon, Missouri City, TX (US); Marie Noelle Dessinges, Paris (FR); Gregory Kubala, Houston, TX (US); Christelle Vatry, Notre Dame de Message (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/033,630

(22) Filed: Feb. 19, 2008

(65) Prior Publication Data
US 2009/0205829 A1 Aug. 20, 2009

(51) Int. Cl.
*E21B 33/13* (2006.01)
*E21B 43/267* (2006.01)
(52) U.S. Cl. .................. 166/279; 166/280.2; 166/281; 166/293; 166/308.5
(58) Field of Classification Search ................. None
See application file for complete search history.

(56) References Cited
U.S. PATENT DOCUMENTS

| | | | |
|---|---|---|---|
| 4,510,998 A * | 4/1985 | Peiffer et al. ............... 166/295 |
| 5,310,002 A | 5/1994 | Blauch | |
| 6,169,058 B1 * | 1/2001 | Le et al. .................. 507/222 |
| 6,613,720 B1 | 9/2003 | Feraud | |
| 6,793,025 B2 | 9/2004 | Patel | |
| 6,911,417 B2 | 6/2005 | Chan | |
| 7,004,255 B2 | 2/2006 | Boney | |
| 2006/0283592 A1 * | 12/2006 | Sierra et al. ............... 166/281 |
| 2007/0095534 A1 | 5/2007 | Hughes | |
| 2007/0123431 A1 | 5/2007 | Jones | |
| 2007/0204989 A1 | 9/2007 | Tang | |
| 2008/0066918 A1 | 3/2008 | Smith | |
| 2008/0241267 A1 * | 10/2008 | Verrijk ..................... 424/499 |

FOREIGN PATENT DOCUMENTS

| | | |
|---|---|---|
| EP | 0842657 | 5/1998 |
| WO | 9822093 | 5/1998 |
| WO | 9921933 | 5/1999 |
| WO | 0142387 A1 | 6/2001 |

* cited by examiner

*Primary Examiner*—Zakiya W. Bates
(74) *Attorney, Agent, or Firm*—David Cate; Rachel Greene; Robin Nava

(57) ABSTRACT

A method of plugging a fracture in a subterranean formation which includes placing into the fracture a composition comprising microspheres or microbeads, wherein the microspheres are created by surface crosslinking of droplets in a water-in-water emulsion. Such microspheres may form a filter cake in the formation. The microspheres may include a chemical agent to be released when the microspheres dissolve.

26 Claims, 2 Drawing Sheets

POLYMERIC MICROSPHERES AS DEGRADABLE FLUID LOSS ADDITIVES IN OILFIELD APPLICATIONS

FIELD OF THE INVENTION

The invention relates to fluid loss additives for use in oilfield applications for subterranean formations. More particularly, the invention relates to filter cakes, particularly to easily destroyable filter cakes formed from polymeric microspheres.

BACKGROUND OF THE INVENTION

The statements in this section merely provide background information related to the present disclosure and may not constitute prior art.

Fractures in oilfield reservoirs typically have the highest flow capacity of any portion of the reservoir formation. In natural fractures, the high flow capacity results from the fracture being open and the closure stress being low. In artificially created fractures, the high flow capacity results from the fracture being propped with a permeable bed of material or etched along the fracture face with acid or other material that has dissolved part of the formation. Normally, such high flow capacity is desirable.

However, in the life of an oil well, there are various times in which it is desirable to reduce the flow capacity, by plugging or partially plugging the fracture. Typically, this is when the fracture is producing unwanted fluids such as water or gas, or there is a non-uniformity of injected fluid, or when expensive materials are being injected into non-producing areas of the formation. This is a particularly critical reason as at best the flow of expensive fluid into an already open fracture wastes the material, along with manpower, etc., to produce or increase a fracture where not needed, and in many cases, it results in the growth of a fracture into a region from which undesirable fluid, such as water, is produced. Compositions for plugging fractures to reduce flow of fluids and fluid loss have typically included clays or cement systems. The disadvantages of cements systems are the systems' inability to travel down the fracture without setting and bridging prematurely. The hydrating clays are complex to pump, and require expensive well work, they also must hydrate fully along the fracture and may also bridge prematurely.

Polymer systems have also been attempted for plugging fractures, but often fail due to lack of flow resistance. Further, use of such systems is expensive due to the requirements for large volumes of materials.

A need therefore remains for an inexpensive and reliable well plugging material and for methods of use during well treatments such as well completion, and stimulation, and also during fluids production.

SUMMARY OF THE INVENTION

The invention provides a method of plugging a fracture in a formation by placing into the fracture a composition comprising microspheres or microbeads, wherein the microspheres are created by surface crosslinking of droplets in a water-in-water emulsion.

Further, the invention provides in one aspect, a method of forming filter cakes from crosslinked microspheres, wherein the microspheres are created by surface crosslinking of droplets in a water-in-water emulsion.

In a more general sense, the invention provides a method of treatment of a subterranean formation wherein the treatment fluid comprises microspheres, wherein the microspheres are formed by surface crosslinking of droplets in a water-in-water emulsion.

In one embodiment, the microspheres release at least one chemical agent when dissolved.

In one embodiment, the microspheres are formed from a crosslinked polysaccharide polymer.

In another embodiment, the microspheres are alginate.

In this document, the terms "microsphere", "microbead" and "microparticle" are used interchangeably for microscopic particles, which may contain an interior void.

All percents, parts and ratios herein are by weight unless specifically noted otherwise.

DETAILED DESCRIPTION OF THE INVENTION

Figure 1:
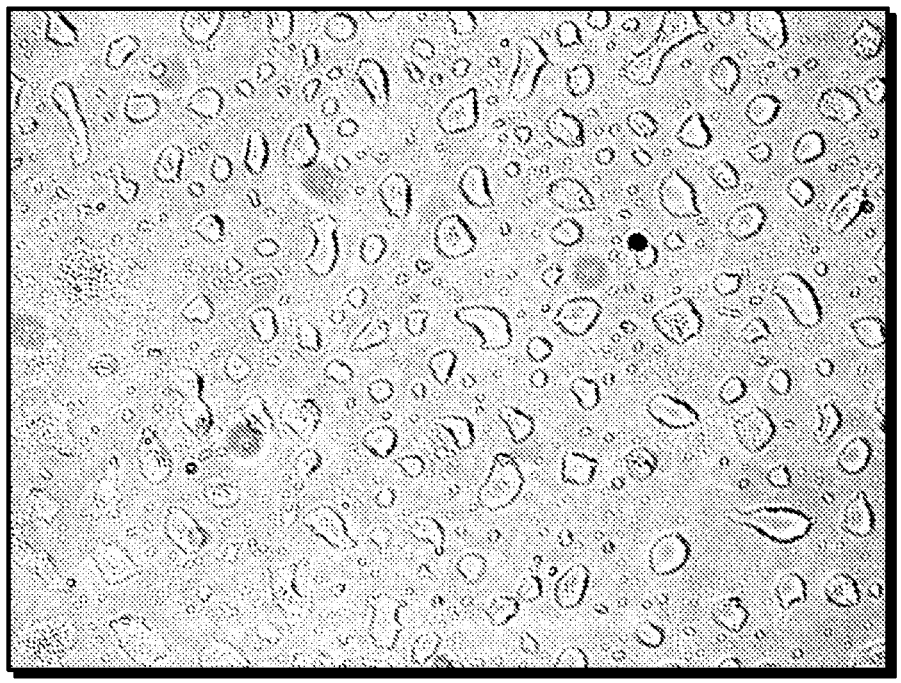
FIG. 1 is a picture of crosslinked guar microbeads made by a water-in-water emulsion process.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Microspheres useful in fluids of the invention are formed from a low viscosity, concentrated polymer solution for rapidly making gelled fluids at the wellsite with minimal equipment and horsepower. When two or more different water soluble polymers are dissolved together in an aqueous medium, it is sometimes observed that the system phase separates into distinct regions. For example, this happens when two polymers are chosen that are each water-soluble but thermodynamically incompatible with each other. Such two-phase systems are referred to as "water-in-water emulsions" in some literature, and ATPS (Aqueous Two Phase Systems) in other literature. In the food industry, such fluids are used to create polymer solutions that mimic the properties of fat globules. Although they may be referred to as "emulsions" they do not necessarily contain either oil or surfactant. In the bio-medical industry, such systems are exploited as separation media for proteins, enzymes, and other macromolecules that preferentially partition to one polymer phase in the mixture.

Microspheres of the invention, once formed, may be added to various fluid compositions, to form treatment fluids for subterranean formations. Such fluids may be aqueous or non-aqueous, and should be selected based on the treatment desired and on the specific polymer(s) used in formation of the microspheres.

The microspheres in the fluid of the invention may, when included at a higher concentrations, form a filter cake in the formation which is easily destroyable when no longer needed.

The microspheres useful in methods of the invention may be formed of crosslinkable polymers such as polysaccharides, guars, alginates, and the like.

At least a portion of the microspheres preferably include a void which may contain one or more chemical agents to be released, including breakers for the filter cake, cleanup agents, and the like.

Specific chemical agents which may be contained in the microspheres of the invention include acids such as organic acids or mineral acids, so long as such acids will not dissolve the microspheres until a delayed period after injection to allow the time desired for the formation treatment. Useful organic acids include polyglycolic acid, polylactic acid, and the like.

When the compositions of the invention are used in the subterranean formation to provide a plug or filter cake over a part of the formation, chemical agents should be chosen for the microspheres such that the filter cake will remain in the formation for the desired length of time. Change in pH or other chemical change brought about by the release of a chemical agent, or simply by the passage of time in contact with the formation will begin to dissolve the microspheres. Dissolution of a substantial amount of microspheres will destroy the filter cake, thus releasing more chemical agents, when present to clean the cake out of the formation after the fluid diversion or other procedure is complete.

In one embodiment, the fluid composition of the invention further comprises a gellable polymer, which gels by means of crosslinking. Dissolution of the microspheres renders the crosslinking agent used during the formation of the microspheres available for crosslinking the gellable polymer, providing a delayed gelled fluid.

Useful gellable polymers include but are not limited to polymers that are either three dimensional or linear, or any combination thereof. Polymers include natural polymers, derivatives of natural polymers, synthetic polymers, biopolymers, and the like, or any mixtures thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan, diutan, and scleroglucan, three biopolymers, have been shown to be useful as well. Synthetic polymers such as, but not limited to, polyacrylamide, polyvinyl alcohol, polyethylene glycol, polypropylene glycol, and polyacrylate polymers, and the like, as well as copolymers thereof, are also useful. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups.

In some cases, the polymer, or polymers, include a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8th Polymers for Adv. Technol. Int'l Symp. (Budapest, Hungary, Sep. 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches: mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from Cesalpinia spinosa seeds) and guar gum (e.g., from Cyamopsis tetragonoloba seeds). In addition, although embodiments of the present invention may be described or exemplified with reference to guar, such as by reference to hydroxy-$C_1$-$C_4$-alkyl guars, such descriptions apply equally to other galactomannans, as well.

Embodiments of the invention may use other additives and chemicals that are known to be commonly used in oilfield applications by those skilled in the art. These include, but are not necessarily limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like. Also, they may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like. Some examples of organic solvents include ethylene glycol monobutyl ether, isopropyl alcohol, methanol, glycerol, ethylene glycol, mineral oil, mineral oil without substantial aromatic content, and the like.

The procedural techniques for pumping fluids down a wellbore to fracture a subterranean formation are well known. The person that designs such treatments is the person of ordinary skill to whom this disclosure is directed. That person has available many useful tools to help design and implement the treatments, including computer programs for simulation of treatments.

EXAMPLES

The following examples are presented to illustrate the preparation and properties of energized aqueous fluids comprising heteropolysaccharides and a surfactant, and should not be construed to limit the scope of the invention, unless otherwise expressly indicated in the appended claims. All percentages, concentrations, ratios, parts, etc. are by weight unless otherwise noted or apparent from the context of their use.

Example 1

Creation of crosslinked guar microspheres as dissolvable fluid loss additives. To create crosslinked guar microspheres, a two-phase aqueous polymer solution was created containing 2 wt % Guar gum and 4 wt % Polyethylene glycol (8000 molecular weight) in DI water. Both polymers were added to the water simultaneously while stirring moderately in a Waring® Blender. The polymers were continuously stirred for an hour to create a hydrated but phase separating bi-polymer solution. Under shear, the polymer solution consists of guar droplets dispersed in a continuous PEG solution.

The solution was sheared in this condition while the pH was brought up to approximately 10, and buffered to this condition by the addition of sodium sesquicarbonate. Once the pH was set, a borate crosslinker solution (in DI water) was added to the sheared polymer blend.

After shearing for an additional two minutes, the blender was turned off and the contents of the polymer solution were examined. Instead of having a liquid guar phase mixed in the PEG solution, the guar polymer was seen to now be in the form of small "microbeads" of crosslinked guar. FIG. 1 shows a picture of the microbeads examined under a microscope.

Bead sizes measured by light scattering on a Malvern Mastersizer® have a mean "diameter" of approximately 100 microns. The beads were observed to remain stable in water at room temperature as long as the pH was buffered to pH 10. Dropping the pH by addition of glycolic acid to approximately pH 3, however, resulted in visible dissolution of the beads. Presumably the low pH environment reverses the borate crosslink on the guar polymer molecules, allowing the guar to dissolve in the water. Based on the known pH sensitivity of borate crosslinked guar, the beads can be expected to be stable at pH greater than about 8, but not below.

Figure 2:
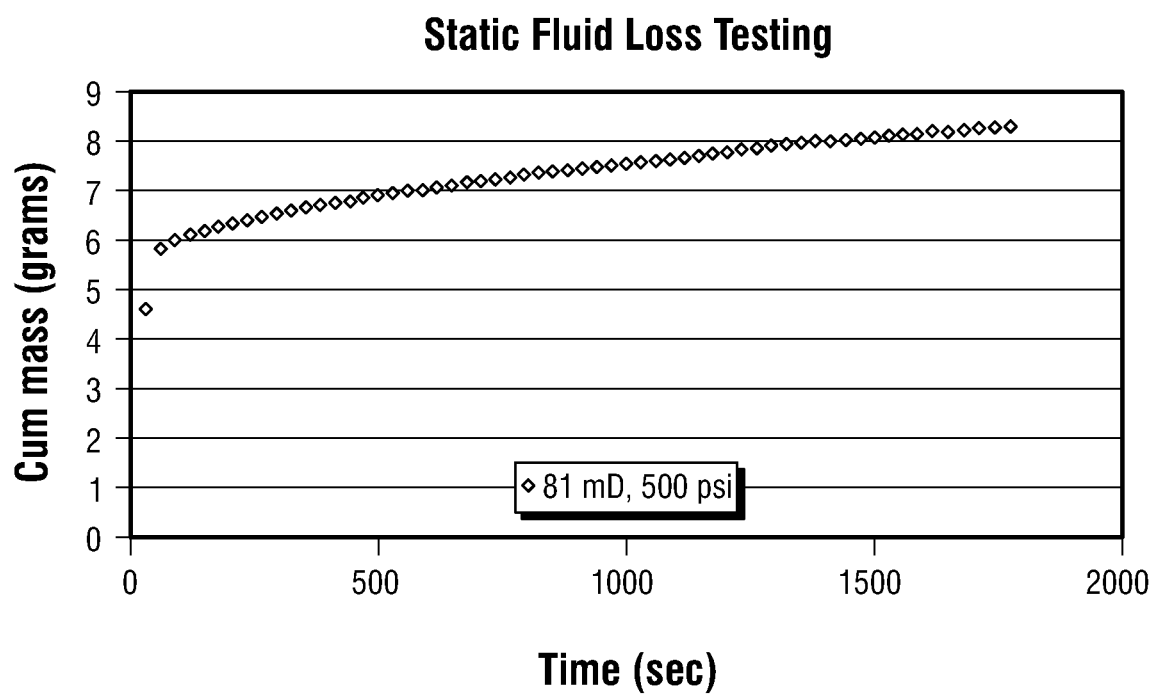
FIG. 2 is a graph of cumulative mass versus time to demonstrate fluid loss measurement for crosslinked guar microbeads.

The crosslinked beads were then tested to verify that they can serve as useful fluid loss agents. FIG. 2 shows a typical data set from the fluid loss testing. In this test, the crosslinked guar beads have been added to a 5% KCl brine buffered to pH 10, but with no additional viscosifier. The beads have been added at a 1% concentration by mass of beads to volume of brine. 180 mL of the brine-bead suspension was placed in a static fluid loss cell and pushed with a differential pressure of approximately 500 psi through a one inch diameter sandstone core with a permeability of approximately 81 mD. (The core is one inch long). As shown in FIG. 2, after an initial spurt of approximately 6 mL of fluid through the core, the beads severely retard further fluid loss. After the initial spurt, only 2.2 mL of additional brine was leaked off over a 30 minute test. Upon completion of the test, the core was removed and examined. A thick filter cake of polymer was clearly visible on top of the core. It should be emphasized that the fluid loss control demonstrated in FIG. 2 was achieved in brine without any additional viscosifier added to the fluid.

Example 2

Crosslinked polymer beads with solid acid particles inside. In a second example of making crosslinked polymer beads from guar, the beads of example 1 have been reproduced, but this time with 8 micron particles of polyglycolic acid embedded within the beads. The process is the same as in example 1, but 0.5% by weight of the PGA particles are added to the guar-PEG water-in-water emulsion before the borate crosslinker is added.

Figure 3:
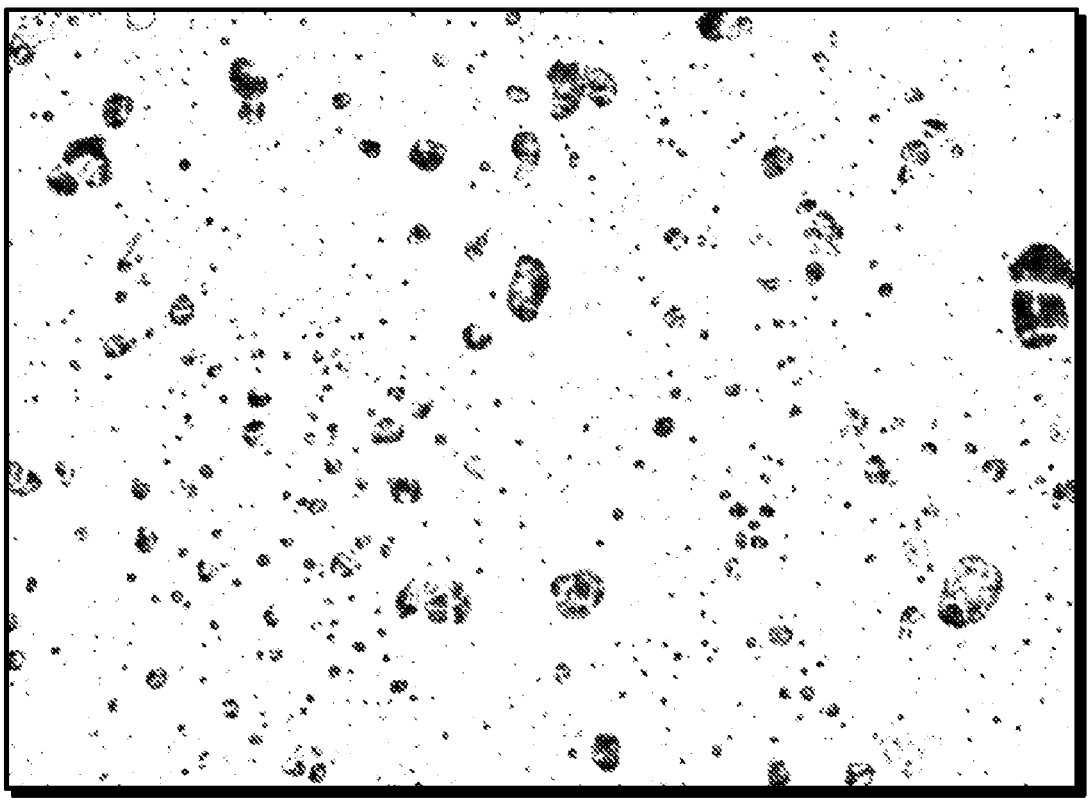
FIG. 3 is a photograph of crosslinked guar microbeads containing 8 micron particles of polyglycolic acid.

Care must be taken to assure that the pH remains above 8 during the addition process, as any free glycolic acid must be neutralized when the PGA is added to the mixture. In the example, this was achieved by use of a pH buffer, sodium sesquicarbonate. FIG. 3 is a picture of the beads embedded with solid acid particles photographed on a microscope slide. The PGA beads are visible as dark spots within the otherwise clear guar beads. The 8 micron PGA particles fit easily in the larger guar beads, and the mean bead size (as measured on the Mastersizer) is still approximately 100 microns.

The crosslinked guar microbeads do dissolve in water or linear gel if the pH is below about pH 8. In this way, the microbeads not only dissolve, but also serve as a means to release crosslinker. They can be used, therefore, as an additive for delayed crosslinking of polymeric fluids Example 3

The previous examples have focused on crosslinked polymeric microbeads made from guar crosslinked with borate. To demonstrate that the approach of phase separating a polymer in a water-water emulsion has broader application for crosslinking microbeads, this example was created by phase separating sodium alginate (an anionic polysaccharide) with polyethylene glycol and then crosslinking the alginate beads with calcium.

Sodium alginate was phase separated as the internal droplet phase of an aqueous solution by adding 0.5% sodium alginate, 10% KCl and 6% PEG 8000 into 100 ml of DI water in a Waring® Blender. After dispersing the polymers and allowing the mixture to stir for a minimum of 30 minutes, 0.3% CaCl2 was added to crosslink the alginate beads. Upon stopping the blender and measuring the size of the beads on the Mastersizer, they were found to have a broad particle size distribution with most of the particles having characteristics sizes between 10 microns and 100 microns with the mean particle diameter being approximately 35 microns.

These beads were visually seen to be dissolvable in clean water when chelant (sodium EDTA) was added to chelate the calcium crosslinker.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of plugging a fracture in a formation by placing into the fracture a composition comprising microspheres or microbeads, wherein the microspheres were created by surface crosslinking of droplets in a water-in-water emulsion.

2. A method according to claim 1 wherein the microspheres release at least one chemical agent when dissolved.

3. A method according to claim 1 wherein the microspheres comprise a crosslinked polysaccharide polymer.

4. A method according to claim 1 wherein the microspheres comprise alginate.

5. A method according to claim 1 wherein the microspheres comprise a void wherein said void contains least one chemical agent.

6. A method according to claim 5 wherein the chemical agent is released when the microspheres dissolve.

7. A method according to claim 5 wherein the chemical agent is a breaker.

8. A method according to claim 1 wherein the composition is a cement composition.

9. A method according to claim 8 wherein the microspheres comprise a void wherein said void contains least one chemical agent.

10. A method according to claim 9 wherein the microsphere release said at least one chemical agent when the microspheres dissolve.

11. A method according to claim 10 wherein the at least one chemical agent is a breaker.

12. A method according to claim 11 wherein the fluid further comprises a polymeric gelling agent, and wherein the microspheres dissolve, and the crosslinking agent used to form the microspheres subsequently causes delayed crosslinking of the polymeric gelling agent.

13. A method according to claim 1 wherein the composition is an aqueous treatment composition.

14. A method of forming a filter cake in a subterranean formation, said filter cake comprising crosslinked microspheres, wherein the microspheres are created by surface crosslinking of droplets in a water-in-water emulsion.

15. A method according to claim 14 wherein the microspheres comprise a crosslinked polysaccharide polymer.

16. A method according to claim 14 wherein the microspheres comprise alginate.

17. A method according to claim 14 wherein said filter cake is substantially destroyed when said microspheres dissolve.

18. A method according to claim 14 wherein the composition is a cement composition.

19. A method according to claim 14 wherein the composition is an aqueous treatment composition.

20. A method of treatment of a subterranean formation comprising providing a treatment fluid comprising a carrier fluid and microspheres, wherein the microspheres are formed by surface crosslinking of droplets in a water-in-water emulsion.

21. A method according to claim 20 wherein the microspheres release at least one chemical agent when dissolved.

22. A method according to claim 20 wherein the microspheres comprise a crosslinked polysaccharide polymer.

23. A method according to claim 20 wherein the microspheres comprise alginate.

24. A method according to claim 20 wherein the microspheres comprise a void wherein said void contains least one chemical agent.

25. A method according to claim 24 wherein the chemical agent is released when the microspheres dissolve.

26. A method according to claim 25 wherein the chemical agent is a breaker.

* * * * *